April 30, 1968  A. H. WILKINSON  3,380,316
TWO-SPEED DRIVE
Filed Dec. 5, 1966  2 Sheets-Sheet 1
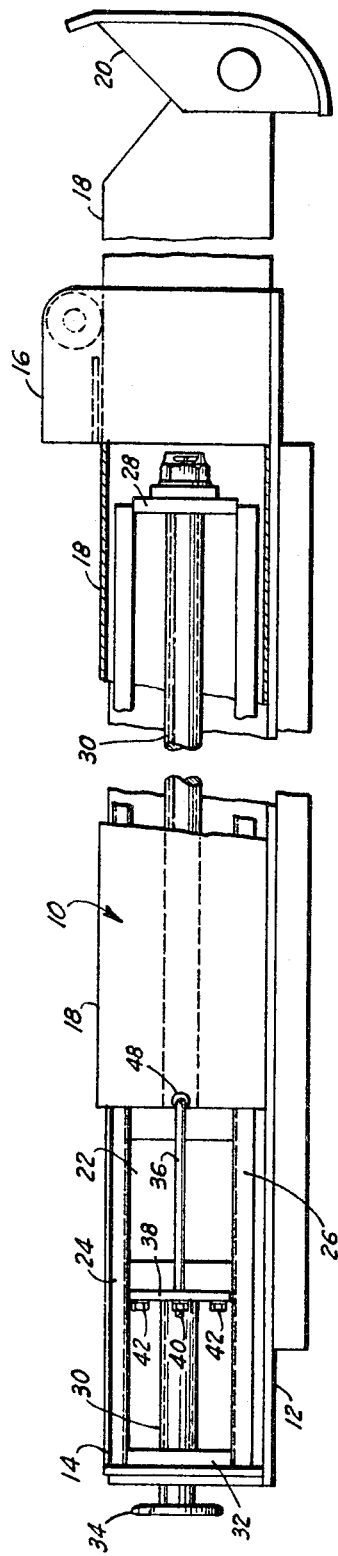
INVENTOR.
Alvin H. Wilkinson
BY
William S. Dorman
ATTORNEY INVENTOR.
Alvin H. Wilkinson
BY
William S. Dorman
ATTORNEY

United States Patent Office 3,380,316
Patented Apr. 30, 1968

3,380,316
TWO-SPEED DRIVE
Alvin H. Wilkinson, Tulsa, Okla., assignor to Auto Crane Company, Tulsa, Okla., a corporation of Oklahoma
Filed Dec. 5, 1966, Ser. No. 599,252
5 Claims. (Cl. 74—424.8)

ABSTRACT OF THE DISCLOSURE

The two-speed drive includes a sometimes rotatable nut mounted on a rotatable screw shaft; the nut and the screw have threads of the same pitch although the rotatable nut has a greater thread diameter than that of the screw shaft; the nut is mounted eccentrically such that one side of the nut threads will engage one side of the screw shaft threads. The nut is spring loaded against a friction plate. Under a non-load condition, when the screw shaft is rotated, the nut will not rotate but will move longitudinally at a relatively high speed until the drive encounters an opposing force of sufficient magnitude to cause the spring to flex. When the spring flexes the nut will move out of engagement with the friction surface and will be free to rotate; this action will shift the drive into low speed where the horizontal travel of the nut is a function of the difference in rotational speeds of the nut and the screw shaft.

The present invention relates to a two-speed drive and, more particularly, to such a drive which is effected by means of a threaded nut mounted eccentrically upon, and having a larger thread diameter than, a threaded screw shaft. The nut is mounted, as stated above, eccentrically with respect to the shaft such that one side of the threads of the nut will engage one side of the threads of the screw shaft. Under a no-load condition, the nut will not rotate and the drive will behave just as if the nut and shaft were of the same thread diameters. The nut is prevented from rotating, under a no-load condition, by means of a spring which forces the nut against a friction surface. Under load, however, the opposing force of the load will flex the spring such that the nut moves away from the friction surface and is free to rotate; thereafter the nut will travel longitudinally with respect to the shaft at a lesser speed than in its non-rotary state. This lower speed is a function of the difference in rotational speeds of the nut and the screw shaft.

Therefore it is a principal object of the present invention to provide a two-speed drive of the type referred to herein. Other and further objects and advantageous features of the present invention will hereinafter more fully appear in connection with a detailed description of the drawings in which:

FIGURE 1 is an elevation, with certain parts broken away, of an outrigger support which is operated by the two-speed drive of the present invention;

FIGURE 2 is an elevation, on a slightly enlarged scale, showing the external details of the two-speed drive per se in FIGURE 1;

Figure 3:
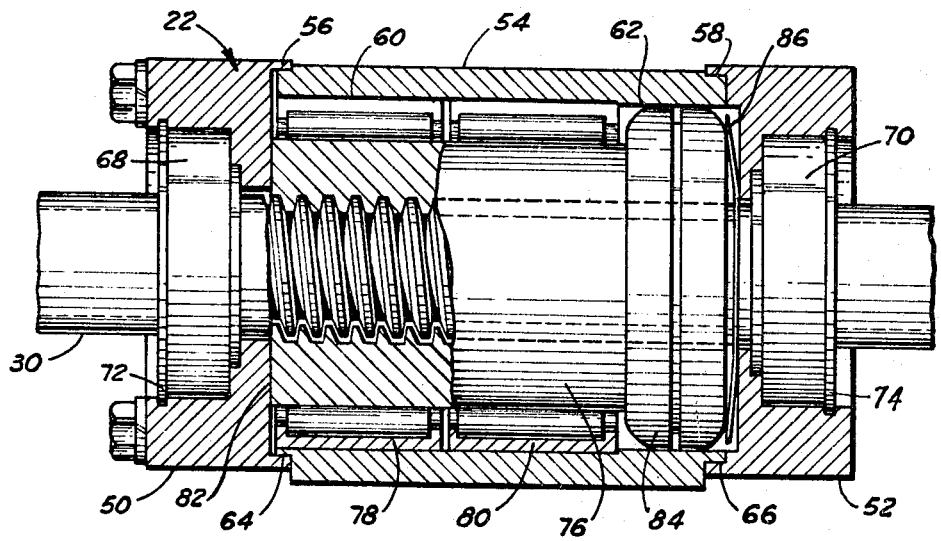
FIGURE 3 is a longitudinal cross-sectional view through the nut, shaft and housing of the two-speed drive shaft shown in FIGURE 2.
Figure 4:
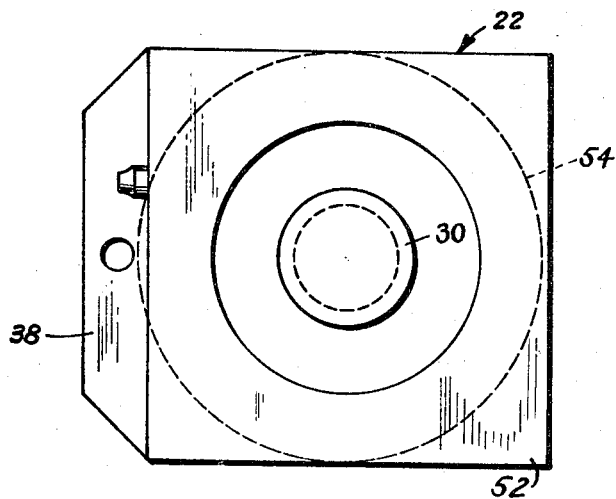
FIGURE 4 is an end view of the nut housing shown in FIGURES 2 and 3.

Referring to the drawings in detail, FIGURE 1 shows an outrigger support, generally designated by the reference character 10, which can be attached to a vehicle (not shown) for preventing the same from tipping under load. Although this outrigger support is shown in a generally horizontal disposition, in actual use it would be inclined with respect to the vehicle so that, as the outer foot is extended, it would approach and contact the ground. The outrigger support 10 includes an elongated frame structure 12 which is attached at one end 14 by any convenient means (not shown) to the vehicle. The frame structure 12 is also attached at its other end 16 to the same vehicle although in a generally lower location than the end 14. An elongated leg 18 is slidably mounted on the frame 12 so as to move towards the right or left with reference to FIGURE 1. At the outer end of the leg 18 there is pivotally attached a foot 20 which will engage at the ground (not shown) when the leg 18 is extended a sufficient amount. A nut housing 22 is mounted for longitudinally sliding movement between a pair of horizontal rods or tracks 24 and 26. The housing 22 engages the tracks 24 and 26 in such a way that the housing 22 will not rotate with respect to the tracks but will be freely longitudinally movable with respect thereto. As shown in FIGURE 1 the left hand ends of the tracks 24 and 26 are suitably secured to the frame structure 12 whereas the right hand ends are connected by means of a suitable plate 28. A threaded shaft 30 extends longitudinally through the housing 22 within the frame structure 12. The shaft 30 is suitably bearing mounted with respect to the plate 28 and also with respect to a plate 32 which is mounted at the left hand end of the support 12. The outer left hand end of the shaft 30 is suitably keyed to a sprocket 34. The housing 22 is connected to the leg 18 by means of a rod 36. As best shown in FIGURE 2, the rod 36 is connected to a tab 38 by means of a nut 40. The tab 38, in turn, is connected to the housing 22 by means of screws 42. The right hand end 44 of the rod 36 is disposed in parallel and offset relation with respect to the main part of the rod 36 by virtue of the double ring angled bend 46. The right hand end of the rod 36 engages the leg 18 through the hole 48.

Referring now to FIGURE 3, the housing 22 is composed of end caps 50 and 52 and an intermediate hollow cylindrical portion 54. The end caps 50 and 52 are provided with inwardly facing lips 56 and 58 respectively which engage corresponding recesses on the outer surface of the intermediate cylindrical member 54 as will hereinafter appear. The cylindrical member 54 is provided with a bore 60 of a given diameter which is co-axial with the cylindrical member 54 itself. A second bore 62 of slightly smaller diameter than the bore 60 is also provided within the cylindrical member 54 in co-axial relation therewith. The annular grooves or ridges 64 and 66 on the outer ends of the cylindrical member 54 are, however, not co-axial with respect to the central axis of the cylindrical member 54 but are offset in relation thereto and co-axial with each other, whereby, when the cylindrical member 54 is inserted between the end caps 50 and 52 as shown in FIGURE 3, the longitudinal central axis of the intermediate cylindrical member 54 will be below the longitudinal axis through the end caps 50 and 52. The threaded screw 30 extends through the housing 22 in co-axial relation with the ends caps 50 and 52. The end caps 50 and 52 have mounted therein suitable bearings 68 and 70 which are held in place by means of retaining rings 72 and 74, respectively. Bearings 68 and 70 serve to hold the threaded shaft 30 in axial alignment with the end caps.

A threaded nut 76 is positioned within the housing 22 and surrounding the threaded shaft 30. It should be noted that the threaded nut 76 has threads of the same pitch as that of the screw shaft 30 although the thread diameter of the internal threads in the nut 76 is larger than the external thread diameter of the threads on the shaft 30. It should also be noted with respect to FIGURE 3, that the threads of the two members 30 and 76 are in intimate engagement with each other only along the upper portion of contact between these two members. The nut 76 is maintained in its eccentric relation with respect to the shaft 30 by means of roller bearings 78 and 80 which are received within the bore 60. The left hand end of the nut 76 engages a flat surface 82 on the inside of the end cap 50. This surface 82 will be referred to as the "frictional surface." The right hand end of the nut 76 will engage a thrust bearing 84 which is received within the bore 62. A spring washer 86 is located between the right hand end of the thrust bearing 82 and the interior left hand end of the cap 52.

Referring now to FIGURES 1 and 3, if a rotating force is applied to the sprocket 34 by means of a chain (not shown) and a driving sprocket (not shown) the shaft 30 can be turned in such a direction as to cause the nut 76 to move towards the right, forcing the housing 22, leg 18 and shoe 20 also towards the right. The housing 22 will slide along the tracks 24 and 26. With no load imposed upon the foot 20, the spring 86 will be in the condition shown in FIGURE 3 and the left hand end of the nut 76 will continue to bear against the friction surface 82 such that the assembly will move towards the right at a relatively high longitudinal speed. If a load should be encountered, for example, by the foot 20 contacting the ground, the resulting force against the housing 22 would cause the spring 86 to flex thereby permitting separation between the left hand end of the nut 76 and the frictional surface 82 and, in turn, permitting free rotational movement of the nut 76. The entire assembly would then move towards the longitudinal right, under load, at a longitudinal speed which would be a function of the difference in rotational speeds of the nut 76 and the screw shaft 30. For example, let us assume that the pitch of the nut 76 and the screw 30 is sixteen threads per inch, that the diameter of the screw is 12/16 of an inch and the diameter of the threaded hole in the nut is 13/16 of an inch. If the nut were held stationary, 16 revolutions of the screw 30 would produce a one inch longitudinal displacement of the nut 76. If the nut were rotatable (under a load condition) the screw 30 would make a complete revolution before the nut 76 would make a complete revolution as a result of the differences in diameter between their mating portions. Under the conditions assumed above, while the screw 30 is making 13 revolutions, the nut will make 12 revolutions. Thus, 13 revolutions on the screw will produce a 1/16 of an inch displacement of the housing 22. The arrangement under the assumed conditions will create a 13 to 1 speed reduction.

Although the present invention has been described in particular relation to a drive for an outrigger, it should be obvious that this drive would have more universal utility in similar situations where it is desirable to provide high and low speeds under no-load and load conditions, respectively. Although the present invention has been described in particular relation to the drawings attached hereto, it should be understood that other and further modifications apart from those shown herein may be made within the spirit and scope of this invention.

What is claimed is:

1. A two-speed drive comprising an elongated threaded shaft having thereon external threads of a given pitch and diameter, a threaded nut received on said shaft and having internal threads of said given pitch but having a thread diameter greater than the thread diameter of the external threads on said shaft, means for supporting said nut with its central axis parallel to and offset with respect to the central axis of said shaft whereby a longitudinal portion only of the threads on said nut mesh with a longitudinal portion only of the threads on said shaft, resilient means for preventing rotation of said nut when a relatively low longitudinal thrust is imposed on said nut, said resilient means permitting rotation of said nut when a relatively greater longitudinal thrust is imposed on said nut.

2. A two-speed drive as set forth in claim 1 wherein said nut is enclosed in a housing, said housing comprising a pair of end caps longitudinally spaced from each other and bearing mounted on said shaft and an intermediate member connecting with said end caps, said intermediate member constituting said means for supporting said nut with its central axis parallel to and offset with respect to the central axis of said shaft, one of said end caps having an internal flat surface located adjacent one side edge of said nut, a spring constituting said resilient means located between the other end of said nut and the other of said end caps for resiliently urging said nut against said surface.

3. A two-speed drive as set forth in claim 2 wherein said intermediate member comprises a cylindrical body having an interior bore therein which is parallel to and offset with respect to the central axis of said shaft, said nut being supported within said bore by bearing means.

4. A two-speed drive as set forth in claim 3 including a thrust bearing interposed between said nut end of said nut and said spring.

5. A two-speed drive as set forth in claim 1 wherein said nut is enclosed within a housing, said housing comprising a pair of longitudinally spaced end caps and an intermediate cylindrical member, said intermediate cylindrical member having a central axis parallel to and offset with respect to the central axis of said shaft, said end caps having flanged portions extending inwardly towards each other in co-axial relation with the central axis of said shaft, said intermediate cylindrical member having external annular recesses mating with the flanges on said end caps, said annular recesses being co-axial with each other but offset with respect to the central axis of said cylindrical member, first bearing means mounted within said cylindrical member for supporting said nut with its central axis parallel to and offset with respect to the central axis of said shaft, one of said end caps having a transverse flat surface located adjacent one end of said nut, a second bearing means disposed within said cylindrical member adjacent the other end of said nut and constituting a thrust bearing, a spring means constituting said resilient means located between said second bearing means and said other end caps for urging said nut resiliently against said flat surface.

References Cited

UNITED STATES PATENTS

| 2,616,302 | 11/1952 | Wahlmark | 74—459 |
| 2,918,827 | 12/1959 | Brown | 74—424.8 |
| 3,277,737 | 10/1966 | Goodman | 74—424.8 |

DONLEY J. STOCKING, *Primary Examiner.*

LEONARD H. GERIN, *Examiner.*